Oct. 9, 1923.
W. F. SOMES
1,470,587
PACKING FOR TURBINE SHAFTS AND THE LIKE
Filed June 19, 1919
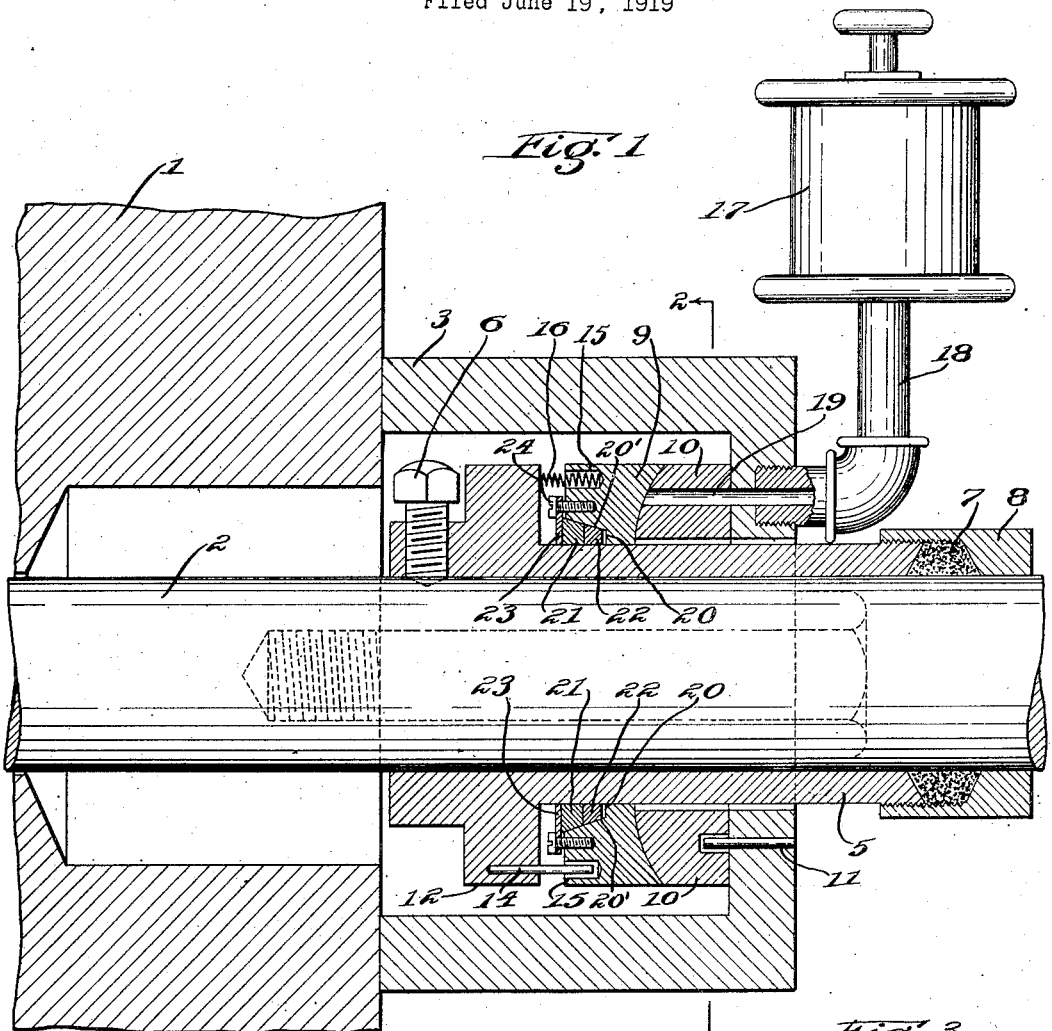
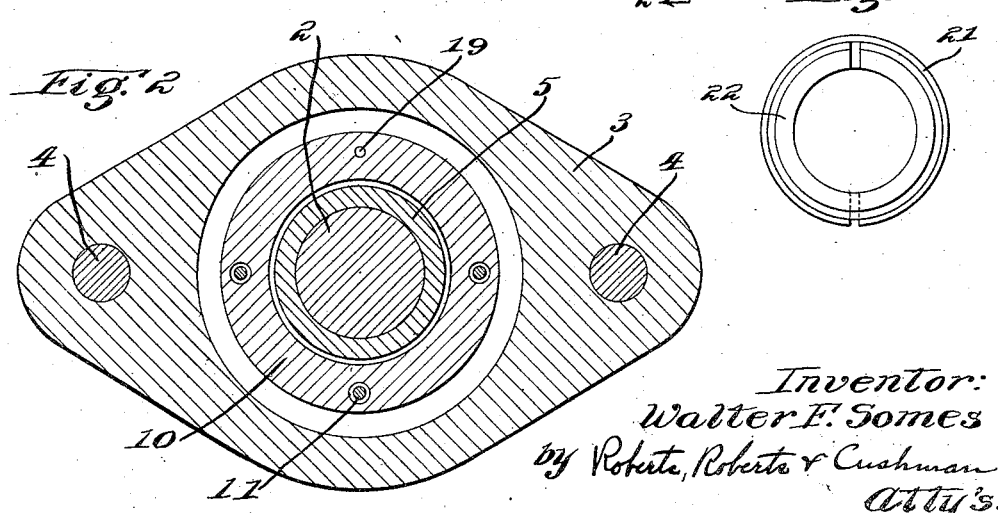
Inventor:
Walter F. Somes
by Roberts, Roberts & Cushman
Atty's.

Patented Oct. 9, 1923.

1,470,587

UNITED STATES PATENT OFFICE.

WALTER F. SOMES, OF JAMAICA PLAIN, MASSACHUSETTS.

PACKING FOR TURBINE SHAFTS AND THE LIKE.

Application filed June 19, 1919. Serial No. 305,262.

*To all whom it may concern:*

Be it known that I, WALTER F. SOMES, a citizen of the United States, and resident of Jamaica Plain, Boston, Massachusetts, in the county of Suffolk and State of Massachusetts, have invented new and useful Improvements in Packing for Turbine Shafts and the like, of which the following is a specification.

This invention relates to packing for rotatable shafts and more particularly to shaft packing of the general type disclosed in my prior Patent No. 836,408, granted November 20, 1906, and this application is in part a continuation of my prior application Serial No. 249,050, filed August 9, 1918, now Patent No. 1,308,454, July 1, 1919.

In packing shafts which enter the steam chambers of engines it has been customary to employ a plurality of rings made up of segments, the rings being disposed side by side within the wall surrounding the shaft with their juxtaposed faces bearing tightly against each other so as to prevent steam from passing therebetween. These segmental rings are difficult to manufacture and adjust and due to their frictional engagement with the shafts the wear is rapid and soon permits steam to escape around the rings.

The principal objects of the present invention are to overcome the difficulties incident to packing rings of the aforesaid and other types and to provide packing rings which are self-adjusting and self-aligning and which do not wear the shaft or other part about which they are employed whereby leakage of steam therearound is avoided even after they have been in use for a long time.

Other objects of the invention will be apparent from the following description and accompanying drawings in which I have disclosed my invention by way of example as applied to a steam turbine.

In the drawings,—

Figure 1 is a longitudinal central section of one embodiment of my invention;

Figure 2 is a section taken on line 2—2 of Figure 1;

Figure 3 is a detail of the packing rings shown in Figure 1.

In Figs. 1 and 2 I have illustrated my invention as applied to a turbine, 1 representing a turbine casing, and 2 the turbine shaft. The packing is mounted in a cap 3, which is secured to the end of the casing 1 by means of stud bolts 4.

The embodiment of my invention illustrated in Fig. 1 comprises a sleeve 5 which is secured to the shaft 1 in any suitable manner as by a pressed fit, key connection, by being formed integrally with the shaft, or by means of a set-screw such as illustrated at 6 in Fig. 1. The sleeve 5 extends beyond the end of cap 3 and at its outer end is provided a packing of any suitable type, as for example the ordinary packing illustrated in Fig. 1, which comprises packing material 7 confined in an annular recess between the end of the sleeve 5 and the cap 8.

The main packing joint is between the rings 9 and 10, which are preferably formed of babbitt and cast iron respectively. These rings are continuous and their contacting surfaces are preferably curved from inside to outside as shown in Fig. 1. The ring 10 is prevented from rotating by means of pins 11 or in other suitable manner. The sleeve 5 is provided with a flange 12 near its inner end and of substantially the same diameter as the ring 9.

For the purpose of securing a steam-tight joint between ring 9 and sleeve 5, the ring 9 is provided with an annular recess 20 having a tapered wall 20'. Within the recess and tightly surrounding the sleeve 5 are two split packing rings 21 and 22 having beveled edges cooperating with the tapered wall 20' of recess 20. These rings are retained within the recess by an annular plate 23 loosely secured to the end of ring 9 to allow longitudinal movement of the plate 23 under the action of fluid pressure relative to said ring by screws 24. By reference to Fig. 3 it will be seen that the rings 21 and 22 are so associated that the cleft in one ring is disposed 180° from the cleft in the other ring to prevent leakage of steam through the clefts of the rings. In operation the pressure of steam against plate 23 presses the rings into the recess 20 and owing to the beveled engagement between the rings and the tapered wall of the recess the rings are wedged tightly against the ring 9 and against the sleeve 5 effecting a steam-tight joint while still permitting the ring 9 to be automatically adjusted longitudinally of the shaft.

The ring 9 is arranged to rotate with the sleeve 5 and this may be effected in any suitable manner, as for example by means of pins 14 projecting from the flange 12 into sockets 15 in the ring 9. Springs 16 are provided in sockets in the ring 9 to engage the flange 12 and yieldingly urge the ring against the ring 10. Any suitable number of pins 14 and springs 16 may be employed, the pins and springs being suitably spaced about the shaft, and if desired the pins and springs may be disposed in the same sockets with the pins extending along the axes of the springs.

In order to lubricate the contacting surfaces between the rings 9 and 10 a lubricant cup 17 is arranged to communicate with the space between the rings 9 and 10 through pipe 18 and a duct 19 extending lengthwise through the ring 10. Clearance is provided between ring 10 and sleeve 5 so that the curved ends of rings 9 and 10 may adjust themselves together.

In operation the ring 9 rotates with the sleeve 5 and shaft 2 and the rotating ring 9 is pressed tightly against the non-rotating ring 10 by means of the springs 16. Inasmuch as the sleeve 5 is tightly fitted to the shaft 2 and rotates with the shaft there is practically no tendency for steam to escape between the sleeve and the shaft, but the packing 7—8 is provided to insure no loss of steam through this space, of the ordinary type such as shown at 13 being adequate for the purpose.

The main packing joint, therefore, is the joint between rings 9 and 10. This joint is kept tightly closed by the springs 16. Oil or grease is supplied to the main contacting surfaces between rings 9 and 10 from the cup 17 through pipe 18 and duct 19. By making the contacting surfaces of the rings 9 and 10 radially curved in the manner shown the parts will automatically adjust themselves more closely together than if they were tapered or made perpendicular to the axis of the shaft and the curvature also tends to prevent the oil or grease from being thrown outwardly from the space between the rings. It will be understood that the end thrust on shaft 2, if any, may be taken up in the ordinary manner by thrust bearings not shown. Considerable clearance is provided between pins 11 and 14, and their cooperating recesses to permit relative movement of the bearing rings for the purpose of automatically adjusting the curved bearing faces of the rings tightly together.

From the above it will be apparent that a gas tight joint is provided between two packing rings, one of which is rotatable and the other of which is stationary, which is automatically adjustable.

It will also be evident that the only surfaces which slide over each other as the shaft rotates are the surfaces between the two main packing rings, the rings being non-rotatably associated with the shaft and casing respectively. Thus the wear is confined substantially to the two rings and is automatically taken up by the automatic axial adjustment of one of the rings. This automatic adjustment may be effected either by steam pressure or by springs or both. In the embodiment shown the adjustment is effected by the combined action of the steam pressure and the springs.

While I have illustrated my invention specifically applied to a steam turbine, it is obvious that it may be applied to any rotary members such as the rotary valve stems on engines of the Corliss type.

I claim:

1. A packing for turbine shafts and the like comprising a flanged sleeve fast to the shaft, a non-rotatable packing ring, a rotatable packing ring interposed between said flange and non-rotatable ring, fluid actuated packing means for providing a tight joint between said sleeve and said rotatable ring, and means for yieldingly urging the rotatable ring against the non-rotatable ring.

2. A packing for turbine shafts and the like comprising a flanged sleeve fast to the shaft, a non-rotatable packing ring surrounding the sleeve, a rotatable packing ring interposed between said flange and non-rotatable ring, a packing means including a tapered annular recess in said rotatable ring and a packing ring having a beveled edge to fit said tapered recess to provide a tight joint between said sleeve and said rotatable ring, and springs interposed between said flange and said rotatable ring for urging said rotatable ring against the non-rotatable ring.

3. A packing for turbine shafts and the like comprising a packing ring encircling the shaft and mounted for rotative movement therewith, a non-rotative packing ring surrounding said shaft and having a side face engaging a side face of the rotatable ring, means yieldingly holding the side faces of said rings together to prevent fluid leakage therebetween, and packing means for providing a fluid tight connection between said rotatable ring and said shaft comprising a tapered annular recess in said rotatable ring and a packing ring having a beveled edge to fit said tapered recess, said last named ring being subject to fluid pressure to maintain it tightly in said recess.

4. A packing for turbine shafts and the like comprising a packing ring encircling the shaft and mounted for rotative movement therewith, a non-rotative packing ring surrounding said shaft and having a side face engaging a side face of the rotatable ring, means yieldingly holding the side faces of said rings together to prevent fluid leakage therebetween, and packing means for providing a fluid tight connection between said rotatable ring and said shaft comprising a tapered annular recess in said rotatable ring and a plurality of packing rings having beveled edges to fit said tapered recess, said last named rings being subject to fluid pressure to maintain them tightly in said recess.

Signed by me at Boston, Massachusetts this 14th day of June 1919.

WALTER F. SOMES.